United States Patent [19]

Steigerwald

[11] 4,445,049

[45] Apr. 24, 1984

[54] INVERTER FOR INTERFACING ADVANCED ENERGY SOURCES TO A UTILITY GRID

[75] Inventor: Robert L. Steigerwald, Scotia, N.Y.

[73] Assignee: General Electric Company, Schenectady, N.Y.

[21] Appl. No.: 334,844

[22] Filed: Dec. 28, 1981

[51] Int. Cl.³ ............................................. H02J 3/38
[52] U.S. Cl. ...................................... 307/45; 363/41; 363/136; 363/139
[58] Field of Search ...................... 363/41, 71, 79, 96, 363/136, 139; 323/906, 300; 307/45, 46; 320/32, 35

[56] References Cited

U.S. PATENT DOCUMENTS

| | | | |
|---|---|---|---|
| 3,694,730 | 9/1972 | Hoft et al. | 363/139 |
| 3,710,229 | 1/1973 | Jessee | 363/41 |
| 3,913,002 | 10/1975 | Steigerwald et al. | 321/2 |
| 4,059,772 | 11/1977 | Wilkerson | 307/46 |
| 4,128,793 | 12/1978 | Stich | 363/96 |
| 4,330,717 | 5/1982 | Coleman | 363/96 |

FOREIGN PATENT DOCUMENTS

| | | | |
|---|---|---|---|
| 1563341 | 2/1970 | Fed. Rep. of Germany | 363/139 |
| 720639 | 3/1980 | U.S.S.R. | 363/132 |

*Primary Examiner*—William H. Beha, Jr.
*Attorney, Agent, or Firm*—William H. Steinberg; James C. Davis, Jr.; Marvin Snyder

[57] ABSTRACT

A transistor is operated in the PWM mode such that a hlaf sine wave of current is delivered first to one-half of a distribution transformer and then the other as determined by steering thyristors operated at the fundamental sinusoidal frequency. Power to the transistor is supplied by a dc source such as a solar array and the power is converted such that a sinusoidal current is injected into a utility at near unity power factor.

10 Claims, 3 Drawing Figures

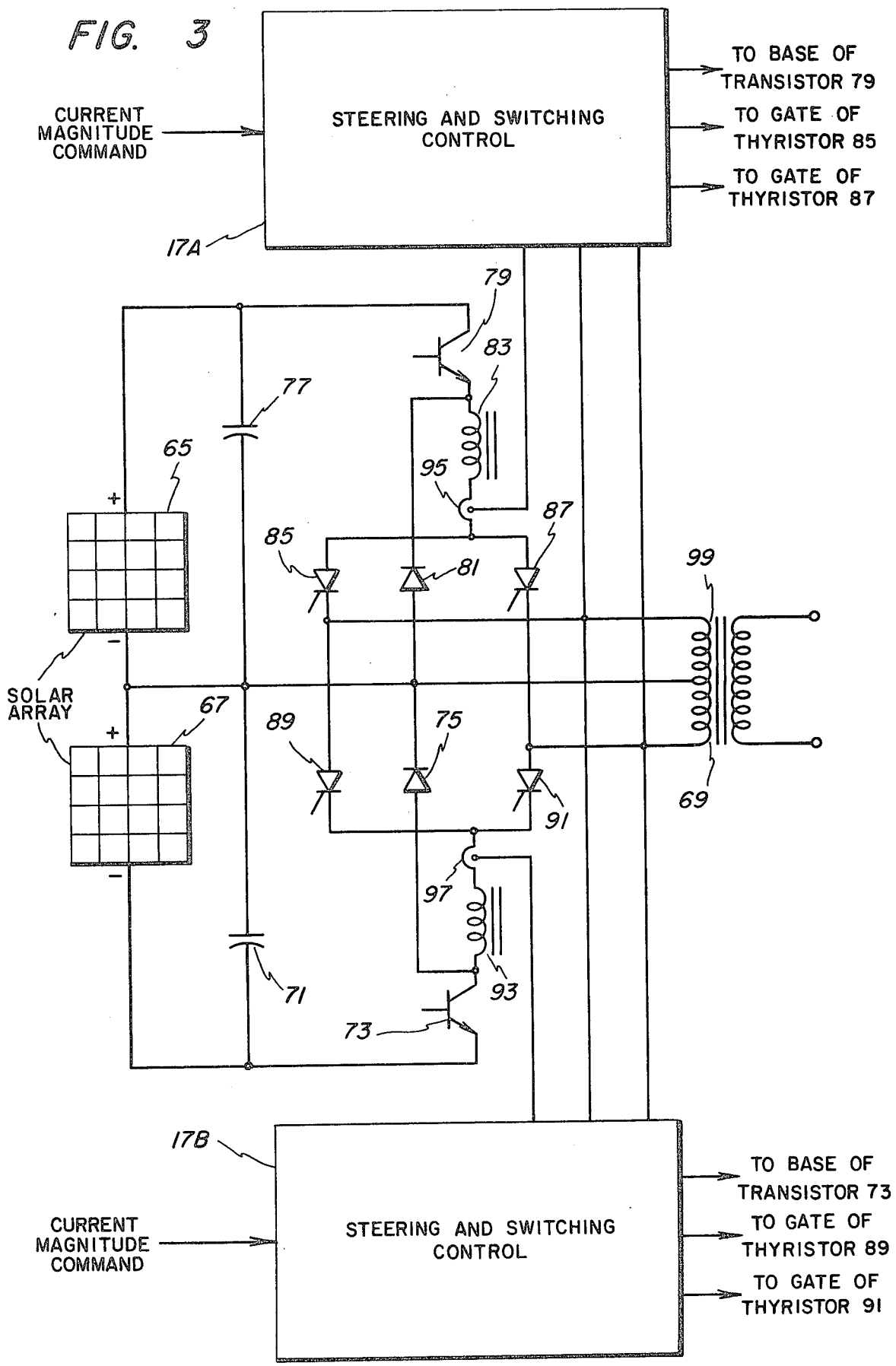

INVERTER FOR INTERFACING ADVANCED ENERGY SOURCES TO A UTILITY GRID

This invention is related to my copending application, Ser. No. 334,843, filed on even date herewith entitled "Full Bridge PWM Inverter With Distributed Device Switching" and assigned to the same assignee as the present invention.

BACKGROUND OF THE INVENTION

This invention relates to inverters useful in interfacing dc energy sources to a utility grid.

Experimental systems to date have used line commutated inverters or uninterruptable power supplies for performing the task of extracting power from a dc source such as a photovoltaic array or a battery and injecting the power into an ac utility. The line commutated inverters, while inexpensive, suffer from (a) poor power factor which may upset the system regulation and/or increase the necessary rating of the transmission equipment and (b) high harmonic currents which can increase losses in motors, capacitors and transmission equipment and interfere with computers and communication equipment. The uninterruptable power supply while maintaining sinusoidal output wave shapes are too expensive for residential applications.

It is an object of the present invention to extract power from a dc source and convert the power such that sinusoidal current is injected into a utility power source at near unity power factor.

It is a further object of the present invention to accomplish the power conversion in an energy efficient and inexpensive manner.

SUMMARY OF THE INVENTION

In one aspect of the present invention a dc to ac inverter is provided which delivers a sinusoidal waveform to a load. The input to the inverter is a dc source and a gate controllable switch is connected in series with the dc source. At least two steering switches connect the controllable switch to opposite sides of the load, the two steering switches are alternately gated at the fundamental frequency of the desired sinusoidal waveform, alternately providing current in a first direction through said load and in a second direction opposite to the first direction. The gate controllable switch is pulse width modulated to achieve a sinusoidal output current waveform.

BRIEF DESCRIPTION OF THE DRAWING

While the specification concludes with claims particularly pointing out and distinctly claiming the present invention, the objects and advantages can be more readily ascertained from the following description of a preferred embodiment when read in conjunction with the accompanying drawing in which:

FIG. 3 is a part schematic, part block diagram representation of still another embodiment of the present invention having double half-wave chopping fed from a cetner tapped dc source and feeding a center tapped load.

DETAILED DESCRIPTION OF THE PREFERRED EMBODIMENT

Figure 1:
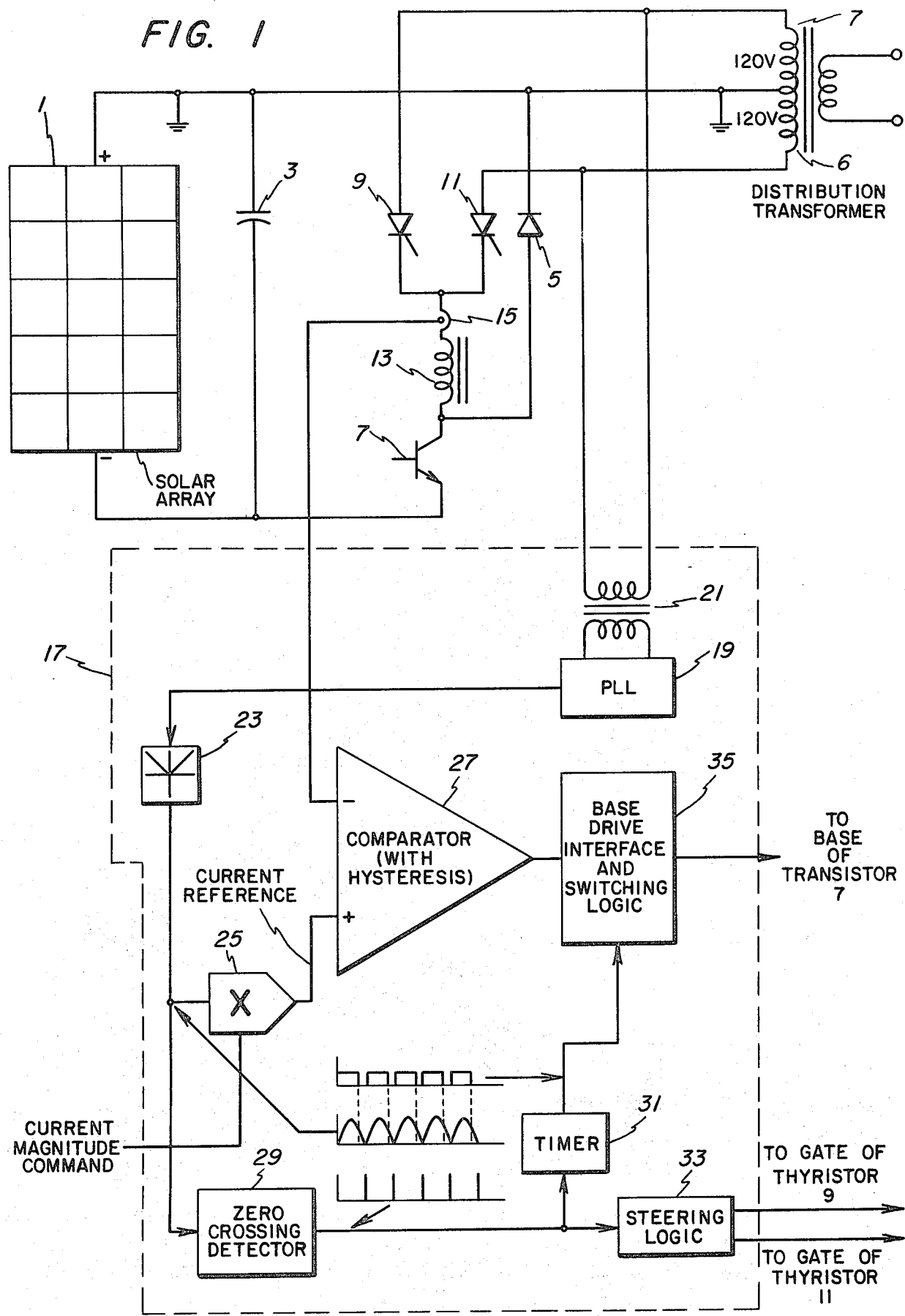
FIG. 1 is a part schematic, part block diagram representation of one embodiment of the present invention having half wave chopping and a center-tapped load.

Referring now to the drawing and particularly to FIG. 1 thereof, a dc source which in the present embodiment is a solar array 1, but a battery bank could also be used, has a filter capacitor 3 connected in parallel across it. Also connected in parallel across the array is the series combination of a coasting diode 5 in series with a gate controllable switch. The gate controllable switch in the present embodiment is an NPN bipolar transistor 7. The emitter of the transistor is connected to one side of the array and the collector of the transistor is connected to the anode of the diode 5. The side of the array connected to the anode of the diode is connected to the center tap of the low voltage winding 6 of a distribution transformer 7. The distribution transformer 7 is connected to a utility grid. The side of the array connected to the center tap can be grounded at the array and also can be grounded at the center tap of the distribution transformer. A switching device shown as a thyristor 9 in the present embodiment has its anode connected to one end of winding 6. A switching device shown as a thyristor 11 has its anode connected to the other end of winding 6. The cathodes of thyristors 9 and 11 are connected to each other and connected between this junction and the collector of transistor 7 is a high frequency inductor 13. A current sensor 15 monitors the current flowing in inductor 13.

A control 17 provides switching signals to the steering thyristors 9 and 11 and pulse width moduated (PWM) signals to transistors 7. The control has a phase locked loop (PLL) 19 which is coupled across winding 6 by a signal level transformer 21. The output of the PLL is connected to an absolute value circuit 23. The output of absolute value circuit 23 is input to a variable gain amplifier 25. The gain of the amplifier varies in response to a current magnitude command provided to the variable gain amplifier. The output of the variable gain amplifier serves as a current reference input to comparator 27. The other input to comparator 27 is from current sensor 15. The output of the absolute value circuit 23 is also connected to zero crossing detector 29. The output of zero crossing detector 29 is connected to a timer 31 and to steering logic 33. The steering logic alternately triggers thyristors 9 and 11. Timer 31 is connected to the base drive interface and switching logic circuit 35. Also connected to the base drive interface and switching logic circuit 35 is the output of comparator 27. The output of the base drive circuit 35 is a PWM signal to the base of transistor 7.

Figure 2:
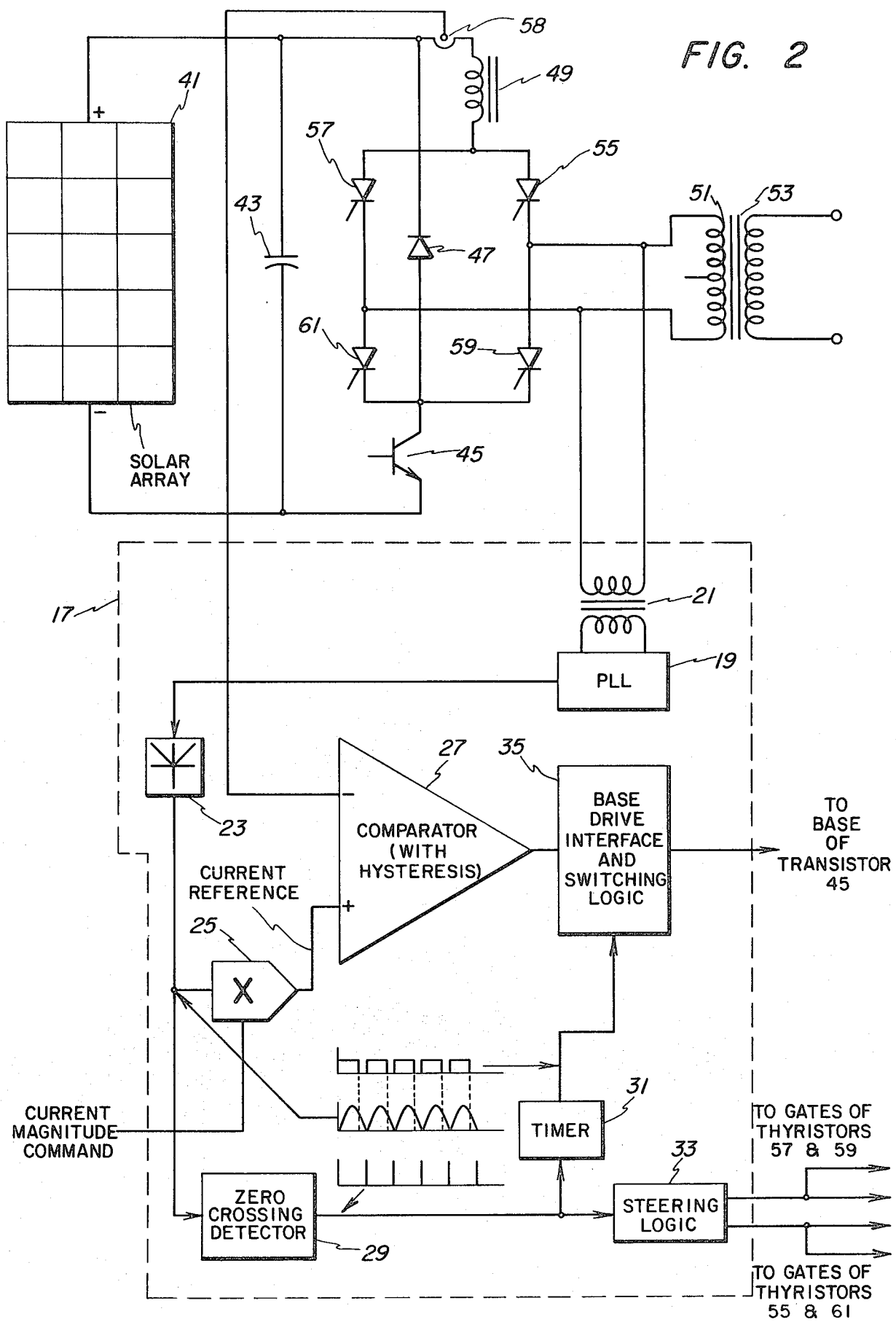
FIG. 2 is a part schematic, part block diagram representation of another embodiment of the present invention having full-wave chopping and not requiring a center tapped load.

Referring to FIG. 2 a dc source is shown in the present embodiment as a solar array 41 which has a filter capacitor 43 connected in parallel with it. A gate controllable switch which in the present embodiment is a bipolar NPN transistor 45 is connected in series with a coasting diode 47. The series combination is connected across the solar array. The anode of diode 47 is connected to the collector of transistor 45. Connected to the positive side of the array is the cathode of diode 47. Also connected to the positive side of the array 41 is one side of a high frequency inductor 49. Connected between the other side of the inductor 49 and one side of a low voltage winding 51 of a distribution transformer 53 is a thyristor 55 with the anode of the thyristor connected to the inductor and the cathode of the thyristor connected to one side of the transformer winding 51. Connected between the other side of inductor 49 and the other side of transformer winding 51 is a thyristor 57 with the anode of thyristor 57 connected to the inductor 49 and the cathode connected to the other side of transformer winding 51. Connected in series with inductor 49 to measure the current flowing through the inductor is a current sensor 58. Connected between the cathode of thyristor 55 and the collector of transistor 55 is a thyristor 59 having its anode connected to the cathode of thyristor 55 and its cathode connected to the collector of transistor 45. Similarly, connected between the cathode thyristor 57 and the collector of transistor 45 is a thyristor 61 having its anode connected to the cathode of thyristor 57 and its cathode connected to the collector of transistor 45.

A control circuit 17 is provided as in FIG. 1 having inputs of dc inductor current, output voltage and the current magnitude command and providing a PWM signal to a transistor 45 and two steering signals the first connected to thyristors 55 and 61 and the second to thyristors 57 and 59.

Referring now to FIG. 3, a center tapped dc source is shown as two solar arrays 65 and 67 connected in series. The junction of the two solar arrays is connected to the center of a center tapped load, shown in this embodiment as a center tapped distribution transformer 69. Connected across solar array 67 is a filter capacitor 71 and the series combination of a gate controlled switch, shown as a bipolar NPN transistor 73 and a coasting diode 75. The cathode of diode 75 is connected to the junction between the arrays 65 and 67 and the anode of diode 75 is connected to the collector of transistor 73. Connected across array 65 is a filter capacitor 77 and also connected across array 65 is the series combination of a gate controllable switch shown as a bipolar NPN transistor 79 and a coasting diode 81. The emitter of transistor 79 is connected to the junction of a high frequency inductor 83 and the cathode of diode 81, and the collector of transistor 79 is connected to one terminal of solar array 65. One end of the high frequency inductor 83 is connected to the emitter of transistor 79 and the other end is connected to two switches which in the present embodiment are phase control type thyristors as are thyristors 85 and 87. The anode of thyristor 85 and the anode of thyristor 87 are connected to inductor 83. Connected to the cathode of thyristor 85 is a switch which in the present embodiment is a phase control type thyristor 89 which has its cathode connected to the cathode of thyristor 85. Similarly, the cathode of thyristor 87 is connected to a switch 91 which in the present embodiment is a phase controlled thyristor 91. The anode of thyristor 91 is connected to the cathode of thyristor 91. The cathode of thyristor 89 and 91 are both connected to one end of a high frequency inductor 93. The other end of inductor 93 is connected to the collector of transistor 73. A current sensor 95 measures the current flowing in inductor 83 and a current sensor 97 measures the current flowing in inductor 93. One end of primary winding 99 of transformer 69 is connected between thyristors 85 and 87 while the other end of winding 99 is connected between thyristors 87 and 91.

A control 17A and 17B is provided. Control 17A and 17B are each configured identically to control 17 in FIG. 1. Control 17A has an input from current sensor 95 and input voltage from across winding 99 and an input of a current magnitude command. The output of control 17A is PWM signal to transistor 79 and a triggering pulse alternately to thyristors 85 and 87. Similarly, control 17B has an input from current sensor 97, the voltage across winding 99 and a current magnitude command. The output of control 17B is a PWM signal to transistor 73 and alternate pulses to the gates of thyristors 89 and 91.

The operation of FIGS. 1, 2 and 3 will now be described, starting with FIG. 1, a half wave chopping circuit. Transistor 7 is operated in the pulse width modulated mode such that a half sine wave of current is delivered to the first one half of the distribution transformer winding 6 and then to the other half of the distribution winding 6 as determined by steering thyristors 9 and 11 which are each triggered at the fundamental frequency (e.g. 60 Hz) of the desired sinusoid. Transistor 7 is operated as a chopper transistor triggered many times during each half cycle of the sinusoidal output waveform. Typically transistor 7 is switched around a 10 kHz rate. High frequency inductor 15 acts as a coasting inductor maintaining continuous current flow and diode 5 acts as a coasting diode providing a path for inductor 13 current when the transistor 7 turns off. Thus, the circuit is a chopper where the load is alternated each half cycle of the output waveform to first one half and then the other half of winding 6 of transformer 7. The PWM signal supplied to transistor 7 is supplied by a control 17 using current band control PWM as follows. A reference signal is developed in control 17 by supplying the output voltage across winding 6 to a PLL 19 which generates a pure sinusoidal waveform in phase with the output voltage but not containing the harmonics that might be present in the output waveform. The sinusoidal output from the PLL is converted to a full wave rectified signal by absolute value circuit 23 which could be a full wave bridge. The magnitude of a full wave rectified waveform is magnitude adjusted in variable gain amplifier 25 dependent on the current magnitude command. One circuit that could be used for generating a current magnitude command is described in my copending application entitled "Maximum Power Control for a Solar Array Connected to a Load", Ser. No. 334,845 and assigned to the same assignee as the present invention. The maximum power control application is hereby incorporated by reference. The output of the variable gain amplifier 25, which is a magnitude adjusted full wave rectified current command, is compared to the actual current flowing in inductor 13, as measured by current sensor 15, in comparator 27. Comparator 27 has hysteresis which causes the actual current to be compared to a reference band extending on either side of the reference signal. The comparator generates a first signal when the actual current exceeds the upper band and second signal when the actual current is less than the lower band. Assuming that transistor 7 is conducting when the current flowing through inductor 13 is greater than the upper band of reference current the transistor is switched off and when the current drops to less than the lower band of reference current, the transistor is switched on. Thus the actual current is kept within a band about the reference current providing a sinusoidal current in phase with the voltage which results in sinusoidal current injected to the utility grid at near unity power factor. More details on the operation of the current band control PWM is available in U.S. Pat. No. 3,913,002 entitled "Power Circuits for Obtaining a High Power Factor Electronically" by R. L. Steigerwald and J. N. Park issued Oct. 14, 1975. This patent is hereby incorporated by reference. The full wave rectified sinusoidal signal from absolute value circuit 23 is also supplied to the zero crossing detector 29. The output of the zero crossing detector is a pulse at twice the fundamental frequency. These pulses are supplied to steering logic 33 which provide pulses alternately to thyristors 9 and 11. The pulses from the zero crossing detector 29 also are connected to a timer which interrupts the chopping signals supplied to the transistor at a time just prior to the end of each half cycle giving sufficient time for the conducting thyristors to turn off. Since the high frequency inductor 13 maintains continuous current to the load during each fundamental half cycle, the current in thyristors 9 or 11 is also continuous allowing inexpensive phase control type thyristors to be used. Because of the high chopping frequency generated by comparator 27 and the base drive interface and switching logic circuit, it is preferable that these be implemented in analog form. The phase locked loop, absolute value circuit, variable gain amplifier and timer could be realized in analog or digital fashion. If gate turn-off devices such as transistors were used in place of thyristors 9 and 11, it would not be necessary to provide a period of zero current to turn off the switches.

A disadvantage of this circuit is that it supplies half sine waves to each half of the distribution transformer low-voltage windings. While this does not affect the waveform at the high voltage winding, it does introduce a dc voltage component and even harmonics from line to neutral at the low voltage side, the neutral being the center tap of the winding. This condition should not affect the transformer since the dc component is exactly balanced by the other half winding, and the second harmonics also cancel so that the line-to-line voltage contains no even harmonics. However, other loads connected line-to-neutral will experience the even harmonics and more importantly the dc components of the voltage. For low power applications, however, (less than 1 kw) the dc component is negligible. The above circuit is simple and low cost and even though a separate transformer is absent from the circuit (the distribution transformer is part of the utility grid) the dc source can be grounded and the dc voltage level is a convenient 200 volts.

FIG. 2 shows a circuit arrangement useful when a center tapped load is not available or need not be used. The circuit performs full wave chopping with the steering thyristors acting as reversing switches providing current first in one direction through the entire winding and then the other. The transistor is pulse width modulated as explained in connection with the transistor in FIG. 1. Thyristors 57 and 59 are switched on after thyristors 55 and 61 have turned off. The solar array cannot be grounded in this arrangement but there is no dc component in winding 51.

FIG. 3 shows a double-half-wave chopping arrangement using two circuits of the type shown in FIG. 1. The two controls 17A and 17B operate independent of one another for determining PWM switching of the two transistors, but when steering thyristor 85 is on, thyristor 91 is on and similarly when steering thyristor 87 is on thyristor 89 is on. This is so, since both controls have an input of the same sinusoidal voltage signal resulting in the same zero crossing detection. The total rating of the circuit is the sum of the ratings of the two halves. The total input filter capacitance 77 and 89 only have the ripple current requirements of a full bridge rather than the double current requirement of a half bridge since power is drawn from each half of the dc source on every half cycle as in a full bridge. This arrangement eliminates the line-to-neutral dc component present in the circuit of FIG. 1. When thyristors 85 and 91 are on a half wave of sinusoidal current is provided in the upper and lower half of winding 99 in a first direction and when thyristors 87 and 89 are on a half wave of sinusoidal current is provided in each half of winding 99 in a second direction opposite to the first. The control 17A and 17B could use just one phase locked loop, one zero detector and one current magnitude command. The redundant system shown has greater reliability since if one control fails the other can still run half the bridge.

The foregoing describes an inverter for interfacing advanced energy sources such as solar arrays to a utility grid such that sinusoidal current is injected into the utility at near unity power factor in an energy efficient and inexpensive manner.

It is understood that the foregoing detailed description is given merely by way of illustration and many modifications can be made therein without departing from the spirit or scope of the present invention.

What is claimed is:

1. A dc-to-ac inverter for injecting a sinusoidal current waveform into an ac utility grid from a dc source comprising:
    gate controllable chopping switch means in series with said dc source;
    at least two steering switch means for connecting said gate controllable switch means to opposite sides of said load;
    means for alternately gating said two steering switch means at the fundamental frequency of the desired sinusoidal waveform to alternately provide current flow in a first direction through said load and a second direction opposite to the first; and
    means for pulse width modulating the gate controllable switch means to achieve sinusoidal current delivered to said utility grid at near unity power factor, said pulse width modulating means having means for sensing current supplied to said utility grid, means for generating a sinusoidal current reference waveform, and comparator means having hysteresis for comparing current supplied to said utility grid to said sinusoidal current reference waveform, and supplying switching pulses to said gate controllable switching means to confine the current supplied to the utility grid to a predetermined band about said sinusoidal current reference waveform.

2. The inverter of claim 1 wherein said gate controllable switch means is a transistor.

3. The inverter of claim 1 wherein said steering switch means is a phase controlled thyristor.

4. A dc-to-ac inverter for injecting a sinusoidal current waveform into a center tapped utility grid transformer from a dc source comprising:
    gate controllable chopping switch means in series with said dc source;
    two steering switch means for connecting said gate controllable switch means to each half of said center tapped transformer;
    means for alternately gating said two steering switch means at the fundamental frequency of the desired sinusoidal waveform to alternately provide current flow in a first direction through one half of said center tapped transformer and in a second direction through the other half of said center tapped transformer; and means for pulse width modulating the gate controllable switching means to achieve sinusoidal current delivered to said utility grid transformer at near unity power factor, said pulse width modulating means having means for sensing current supplied to said transformer, means for generating a sinusoidal current reference waveform, and comparator means having hysteresis for comparing current supplied to said utility transformer to said sinusoidal current reference waveform, and supplying switching pulses to said gate controllable switching means to confine the current supplied to the utility grid transformer to a predetermined band about said sinusoidal current reference waveform.

5. The inverter of claim 4 wherein said gate controllable switch means is a transistor.

6. The inverter of claim 4 wherein said steering switch means is a phase controlled thyristor.

7. A dc-to-ac inverter for providing a sinusoidal waveform to an external center-taped load from a center tapped dc source comprising:

two gate controllable switch means each one in series with one half of said center tapped dc source a first pair of steering switch means for connecting one of said two gate controllable switch means to first one half of said center tapped load and then the other a second pair of steering switch means for connecting the other gate controllable switch means to first one half of said center tapped load and then the other;

first means for alternately gating said first pair of steering switch means at the fundamental frequency of the desired sinusoidal waveform to alternately provide current flow in a first direction in one half of the load and in a second direction opposite to the first in the other half of the load;

second means for alternately gating said second pair of steering switch means at the fundamental frequency of the desired sinusoidal waveform to alternately provide current flow in a first direction which is the same direction as current being provided by said means for gating said first pair but in the other half of said load from current provided by said first means and providing current flow in a second direction in which is the same direction as current being provided by said second means but in the other half of said load from current provided by said second means;

means for pulse width modulating the first gate controllable switching means to achieve sinusoidal current delivered to said load; and means for pulse width modulating said second gate controllable switching means to achieve sinusoidal current delivered to said load.

8. The inverter of claim 7 wherein said means for pulse width modulating comprises:

means for sensing current supplied to said load;

means for generating a sinusoidal current reference waveform; and comparator means having hysteresis for comparing current supplied to said load with said sinusoidal current waveform and supplying switching pulses to confine the current supplied to the load to a predetermined band about said sinusoidal current reference waveform.

9. The inverter of claim 7 wherein said gate controllable switch means is a transistor.

10. The inverter of claim 7 wherein said steering switch means is a phase controlled thyristor.

* * * * *